(12) United States Patent
Jaeger et al.

(10) Patent No.: US 6,553,379 B1
(45) Date of Patent: Apr. 22, 2003

(54) ADDRESS DATA STORAGE DEVICE

(75) Inventors: Christoph Jaeger, Filderstadt (DE); Hans-Peter Schmidt, Filderstadt (DE); Arwed Richert, Filderstadt (DE); Tobias Hahn, Filderstadt (DE); Gerd Herrmann, Filderstadt (DE); Thorsten Klein, Filderstadt (DE)

(73) Assignee: CAA AG, Filderstadt (DE)

( * ) Notice: Subject to any disclaimer, the term of this patent is extended or adjusted under 35 U.S.C. 154(b) by 280 days.

(21) Appl. No.: 09/639,586

(22) Filed: Aug. 16, 2000

(51) Int. Cl.[7] .............................................. G06F 17/30
(52) U.S. Cl. ...................................... 707/10; 707/104.1
(58) Field of Search ........................... 707/1, 10, 104.1; 709/217

(56) References Cited

U.S. PATENT DOCUMENTS 6,049,796 A  *  4/2000  Siitonen et al. ................. 707/3
6,112,174 A  *  8/2000  Wakisaka et al. ........... 704/251
6,114,970 A  *  9/2000  Kirson et al. .......... 340/825.52
6,392,640 B1 *  5/2002  Will ........................... 345/184

FOREIGN PATENT DOCUMENTS

EP           684592 A2 * 11/1995     ....... G08G/01/0968

* cited by examiner

Primary Examiner—Jack Choules
(74) Attorney, Agent, or Firm—Harness, Dickey & Pierce, P.L.C.

(57) ABSTRACT

The present invention relates to an address storage device for a vehicle, particularly a motor vehicle, with several apparatuses using at least parts of address data, the address storage device comprising a storage unit for storing address data and a storage unit interface. Each apparatus is assigned to an application interface, wherein each application interface communicates with the storage unit interface and—if required—reads out at least parts of address data stored in the storage unit and uses them during operation of the apparatus, so that the address data stored centrally in the storage unit are available to the apparatuses commonly.

11 Claims, 4 Drawing Sheets

ADDRESS DATA

| LAST NAME |
|---|
| FIRST NAME |
| TITLE |
| STREET |
| HOUSE NO. |
| ZIP CODE |
| CITY |
| TELEPHONE NO. |
| FAX |
| EMAIL |
| INTERNET |
| COUNTRY |
| BIRTHDAY |
| NOTES | a)

PHYSICAL DATABASE

| ID | POINTER |
|---|---|
| 0 | •→ |
| 1 | •→ |
| 2 | •→ |
| 3 | •→ |
| 4 | •→ |
| 5 | •→ |
| 6 | •→ |
| 7 | •→ |
| 8 | •→ |
| : | : |
| : | : |
| max | ... | b)

LOGICAL ADDRESS MANAGEMENT

| LOGICAL ID | BIT ADDRESS | PHYSICAL ID |
|---|---|---|
| 1 | 00001100 | 17 |
| 2 | 00000000 | 4 |
| 3 | 00100010 | 2 |
| 4 | 00110001 | 12 |
| 5 | 10000010 | 23 |
| 6 | 00000000 | 5 |
| 7 | 01011000 | 1 |
| 8 | 00000100 | 3 |
| : | : | : |
| : | : | : |
| max | ... | ... | c)

SUBSET MANAGEMENT

| SUBSET ID | POINTER |
|---|---|
| 1 | •→ |
| 2 | •→ |
| 3 | •→ |
| 4 | •→ | d)

SUBSET TAG

| MENU ID | TYPE | POINTER |
|---|---|---|
| TELEPHONE | TopX | •→ | e)

SUBSET CORE TAG

| LOG ID | POINTER | TopX |
|---|---|---|
| 8 | •→ | 3 |

| LOG ID | POINTER | TopX |
|---|---|---|
| -1 | •→ | 0 | g)

ARRAY OF SUBSETS

| ID | SUBSET CORE | | |
|---|---|---|---|
| 1 | : | | |
| 2 | : | | |
| 3 | : | | |
| 4 | 8 | •→ | 3 |
| 5 | : | | | f)

*Figure - 3*

ADDRESS DATA STORAGE DEVICE

BACKGROUND OF THE INVENTION

The present invention relates to a address storage device for a vehicle, particularly a motor vehicle, with several apparatuses using at least parts of address data, the address storage device comprising a storage means for storing address data and a storage means interface.

More and more, today's motor vehicles are equipped with apparatuses like telephone or navigation system. In closer future apparatuses for internet use or for transmission of e-mails will find entrance into the motor vehicle. All these apparatuses require at least parts of address data for operation; the telephone for example the telephone number of an address data; the navigation system street and city of address data, or the internet use the homepage address of an address data. In prior art systems, the telephone numbers have been input with the respective names into a telephone specific storage, whereas the address data for the navigation system have been stored in a storage of the navigation system.

The separate management of address data results at one hand to a complicated input procedure, since possibly particular address data have to be input several times for different apparatuses of the vehicle. On the other hand, the maintenance of these address data and the use within the vehicle is costly.

Therefore, the object of the present invention is to provide an address data storage device overcoming the aforementioned disadvantages.

SUMMARY OF THE INVENTION

The object of the present invention will be solved by the aforementioned address data storage device such that each apparatus is assigned to an application interface, each application interface communicates with said storage means interface and—if required—reads out at least parts of address data stored in said storage means so that said address data stored centrally in said storage means are available to said apparatuses commonly.

That means with other words that the address data are stored within the vehicle centrally in a storage means and the apparatuses read the necessary parts of the address data out of the central address data storage. That results in the advantage that redundant data have not to be stored for different apparatuses of the vehicle. Moreover, the input, the use and maintenance of the address data is clearly simplified compared with known approaches which required a separate input of data for each apparatus. The application-interfaces assigned to the apparatuses are adapted such that they transfer only those data of the plurality of data of an address data record which are requested by the apparatus. Accordingly the application interface of the telephone will request only the telephone number assigned to the selected name. The application interface of the navigation system will, however, request street and city of the respective address data record. The selection of single data from the address data record will be carried out by the storage means interface. It is apparent that this functionality could also be transferred to the application interface which will then take the necessary data out of the received complete data record.

In a further embodiment of the invention said storage means interface is connected with an input-/output-unit, the input/output unit allowing the display of address data and the selection of address data.

This measure has the advantage that the input and output of address data can also be carried out centrally. Hence, the input/output means of the respective apparatuses will no longer be used as it is the case in prior approaches resulting in an increased simplification of operation and maintenance of address data. Also, the selection of data is easier since the data will be displayed to the user always in the same format and on the same display independent of the operated apparatus.

Therefore, it is not necessary that the user permanently adapts to different display formats or places of the display.

In a preferred embodiment of the invention the storage means interface comprises an address management unit for arranging different subsets of address data and for displaying said subsets. Preferably, a subset contains address data recently used and/or a subset containing address data used most frequently; the update will be carried out automatically.

This measure has the advantage that a simplification of the operation is achieved. This is particularly of great use since the attention of the user and driver is not distracted; the page turning within a larger address data stock to find a particular address would not be possible while the vehicle is in motion. Of course other schemes for arranging subsets are possible, for example all address data within a predetermined distance radius from the present location. Also the renunciation of any criterion for search limitation is possible.

As already mentioned, the apparatus can be provided as a navigation system or telephone system of a vehicle. Also possible is an e-mail system or a system for using the internet. It is apparent that this is not a complete enumeration. Other apparatuses of a vehicle requesting for address data are of course also possible.

In a preferred embodiment of the invention the input/output unit is connected with an infrared interface as to allow the optical transfer of address data to and from an external address data base. Preferably, the external address data base is stored in a so called PDA (personal digital assistant), a cellular phone or a laptop.

This measure has the advantage that the address data which already exist electronically, can be transferred easily to the address data storage device so that a manual input of these data is not necessary. Of course it is also possible to provide the input/output unit with a radio interface, for example according to the bluetooth standard, as to carry out the transfer via radio transmission. Moreover, it is of course also possible to fetch the address data via the internet from an internet server.

Preferably, the input/output unit is connected with an input means, preferably a rotary switch means as to allow the input of address data manually as well. In this case the characters and other signs necessary for input of address data will be displayed on a display means and will be selected by the rotary switch means. It is of course also possible to provide a touch screen or a keyboard like input means provided that this is possible for reason of space.

The storage means used for storing address data is preferably provided as a hard disc or an electrically erasable and programmable read-only memory (EEPROM). Other storage media are of course also possible. The storage means could for example be a PCMCIA memory card which could be used both in different vehicles and at a stationary location.

Further advantages and embodiments of the invention will be apparent from the description and the attached drawing.

It is understood that the features mentioned above and those yet to be explained below can be used not only in the respect combinations indicated but also in other combinations or in isolation, without leaving the context of the present invention.

The invention will be explained in more detail with reference to an exemplifying embodiment in conjunction with the attached drawings, in which show:

BRIEF DESCRIPTION OF THE DRAWINGS

FIGS. 3a–3g different illustrations of the address data structure; and

DETAILED DESCRIPTION

Figure 1:
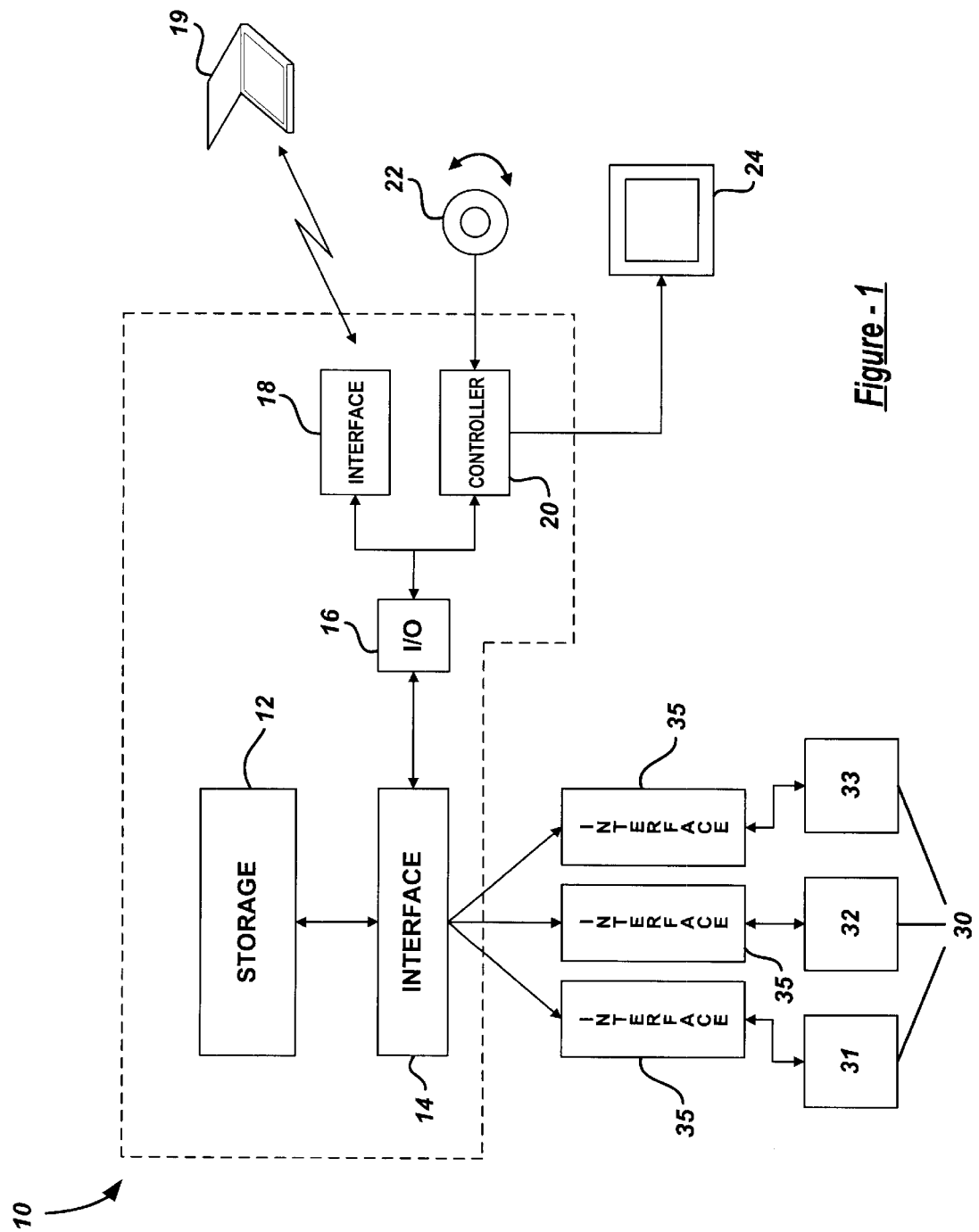
FIG. 1 a schematic block diagram of an address data storage device.

In FIG. 1, a storage device is shown and designated with reference sign 10. The storage device 10 comprises a storage means 12, e.g. in form of a hard disc or an electrically erasable and programmable read-only memory (EEPROM). An address management unit and a storage means interface 14 (only called interface in the following) are connected with the storage means 12. The function of this interface will be described in detail below. The interface 14 communicates with an input/output-unit 16 (called I/O-unit) allowing the input and output of data. The address data storage device further comprises a transfer interface 18 preferably formed as an IrDA-interface, which is connected with the I/O-unit. The IrDA-inferface 18 serves to transfer data optically to mobile devices like a PDA 19 (personal digital assistant) and to receive data therefrom. The PDA 19 is therefore provided with a respective IrDA-interface.

The I/O-unit 16 is further connected with a controller 20 allowing the graphical display of data from the storage means 12 as well as the selection of particular data and the input of data. The selection of data is achieved by means of a menu tree, which is also generated by the controller 20. The controller 20 is provided with a rotary switch 22 for operating the menus and for inputting and selecting data, and is provided with a display/monitor 24 for displaying different menus and data. The display is e.g. provided as a liquid crystal display.

In FIG. 1, several apparatuses 30 are shown which are provided in a vehicle. For example, apparatus 30 is a telephone system 31, a navigation system 32 and an e-mail system 33. The selection of these apparatuses is merely exemplary and is not to be understood as a restriction to the invention. It is to be understood that other types of apparatuses besides the mentioned are employable.

Each apparatus 30 is assigned to an application specific interface 35. This interface 35 is adapted as to allow a communication between the respective apparatus 30 and the storage means interface 14. Particularly, the interfaces 35 are to enable the read out of particular data of the storage means 12. In the present case, the application specific interfaces 35 are to be part of the respective apparatus 30.

In FIG. 1, it is shown by a dashed line that interface 14, storage means 12, I/O-unit 16, IrDA-interface 18 and controller 20 form a unit being realized by a computer which is operated with operating system Windows NT, Windows 98 or Windows CE.

The communication of the address data storage device 10 with application specific interfaces 35 and the apparatuses 30 is carried out by a bus system, e.g. a CAN-bus system.

The way of operation of the address data storage device 10 shown in FIG. 1 will now be described in detail with reference to FIGS. 2 to 4.

As already mentioned, the address data are stored in the storage means 12. These data will be selected (read out) by the interface 14 via physical addresses. In addition to these physical addresses, the interface 14 keeps a list of logical addresses, each physical address being assigned to a logical address in this list. The management and processing of address data is performed for reasons of simplicity through the logical addresses in general.

Figure 2:
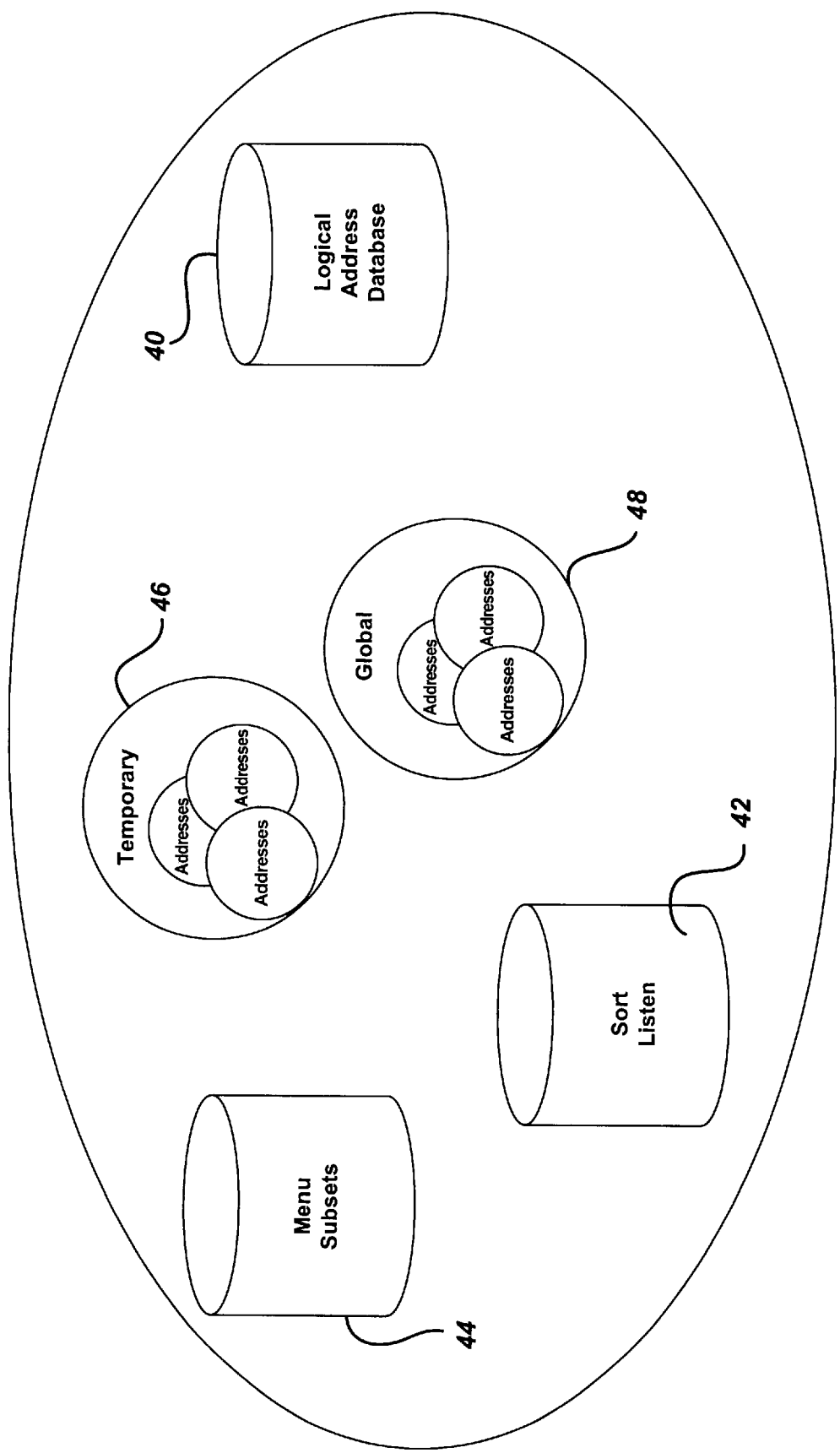
FIG. 2 a schematic illustration of the storage structure.

In FIG. 2, it is schematically shown, which different address lists are kept by the interface 14. First, the list referenced with 40 exists in which the assignment of logical addresses to physical addresses (so-called address management) is contained. Besides, further lists exist, e.g. sorted lists 42, in which the address data are sorted and indexed, respectively, to allow faster access. Last but not least, lists 44 are provided, in which particular subsets of address data are kept as to make the selection out of a larger address data stock easier. Criteria for the arrangement of such subsets could for example be the frequency of use of single address data or for example address data most recently used.

In FIG. 2, two further fields are shown one of which referenced with 46 temporarily stores addresses and serves as intermediate memory for keeping data during the operation in the event of physically deleting an address. The field referenced with 48 serves for globally storing particular addresses to which an access is always possible independent of which apparatus is presently operated.

With reference to FIG. 3, the structure of the data and lists will be described below. In FIG. 3a the structure of an address data record is shown. Such an address data record comprises all necessary address data, for example name, prename, title, street, building number, zip code, city, telephone, fax, e-mail, internet, country, birthday and notes. Of course an address data record could comprise further information for example company name, position etc. A plurality of such address data records is stored at determined physical addresses in the storage means 12. These addresses (pointers) are indicated in a list, which is shown in FIG. 3b. Each address data record is signed to a physical address or identification number (ID) on the basis of which the respective address can be found in the list shown in FIG. 3b.

As already mentioned, the interface 14 operates with logical addresses which is the reason for keeping an assignment list (mapping list) between logical addresses and physical addresses. This list is shown in FIG. 3c. In this logical address management list each physical address and ID, respectively, is assigned to a logical address and ID, respectively, which for example are used when arranging subsets. For each assignment/mapping of a physical ID to a logical ID an index about the use of an address by single selectable operation menus is kept. The use is determined by a bitwise addressing and is for data consistency.

As already indicated, different subsets of the complete stored address data are arranged as to simplify the selection of an address data by the user. A subset (LastX) could for example comprise the ten addresses recently used. A further subset (TopX) could for example comprise the most frequently used addresses. Further subsets which could be arranged on the basis of other selectable criteria could be realized as well. In the present embodiment it is assumed that four subsets in total are provided. The management of these subsets is carried out through lists as well, the structures of which are shown in FIGS. 3d to 3g. FIG. 3d shows the list for the subset management, which comprises for each created subset an address (pointer) to the single corresponding address data records. Since in the present embodiment four subsets in total are realized, the list contains four subset-IDs in total. The management and assignment of subset-IDs is carried out by the interface 14.

In FIG. 3e the data structure of a so-called subset-tag is shown which comprises the index of the menus (menu ID) initiating the address data selection. Further, the type of subset (TopX, LastX, . . . ) is indicated by a determined value. Then it follows an address pointer to an array of so-called subset-core-tags in which the real address information is contained. In FIG. 3f such an array of subsets is shown. The desired number of entries in this array of subsets determines its size (in the present embodiment five entries, i.e. five address data records are provided) and will be prescribed by a constant value unique for all subsets. The real address information lie in the so-called subset-core-tags. The position in the array is at the same time the hierarchy and will be arranged depending upon intended purpose.

In FIG. 3g the data structure of a subset-core-tag is now shown. Such a subset-core-tag comprises the reference to the address of the respective address data record and a so-called TopX counter. The address itself will be addressed by means of the pointer to the logical address management list. The TopX counter will only be required when being used as TopX subset and is menu specific. The processing for arranging hierarchy, that is to sort the respective subset TopX will be carried out on the basis of the TopX counters (distant counters). The initial value is assumed to be zero. As to avoid overflow of the counter, the maximum numeric distance between two entries is limited to five; other values of course are also possible. An upgrading is achieved by increasing the respective counters. In the event of value similarity with the higher graded entry, both entries, i.e. the subset-core-tags, swap their places in the subset array. Storing of a new address data record will be achieved by degrading all higher graded entries until the last entry has the value zero. Thereafter, the new entry will be put on the last place. If the difference is greater than five (or a greater value, respectively) between two entries, or higher graded entries, each will be degraded by one as well. Therewith a constant distribution will be achieved. This processing will be carried out automatically by the interface 14.

When using the subset LastX it is possible to refrain from using the aforementioned counter TopX. In the respective list (subset array) it is checked when selecting an address data record whether this actual address data record is already in the list. If this is not the case, the logical address (ID) is added at the top, whereas the last address (ID) is deleted; otherwise only the respective address (ID) is added at the top.

Figure 4:
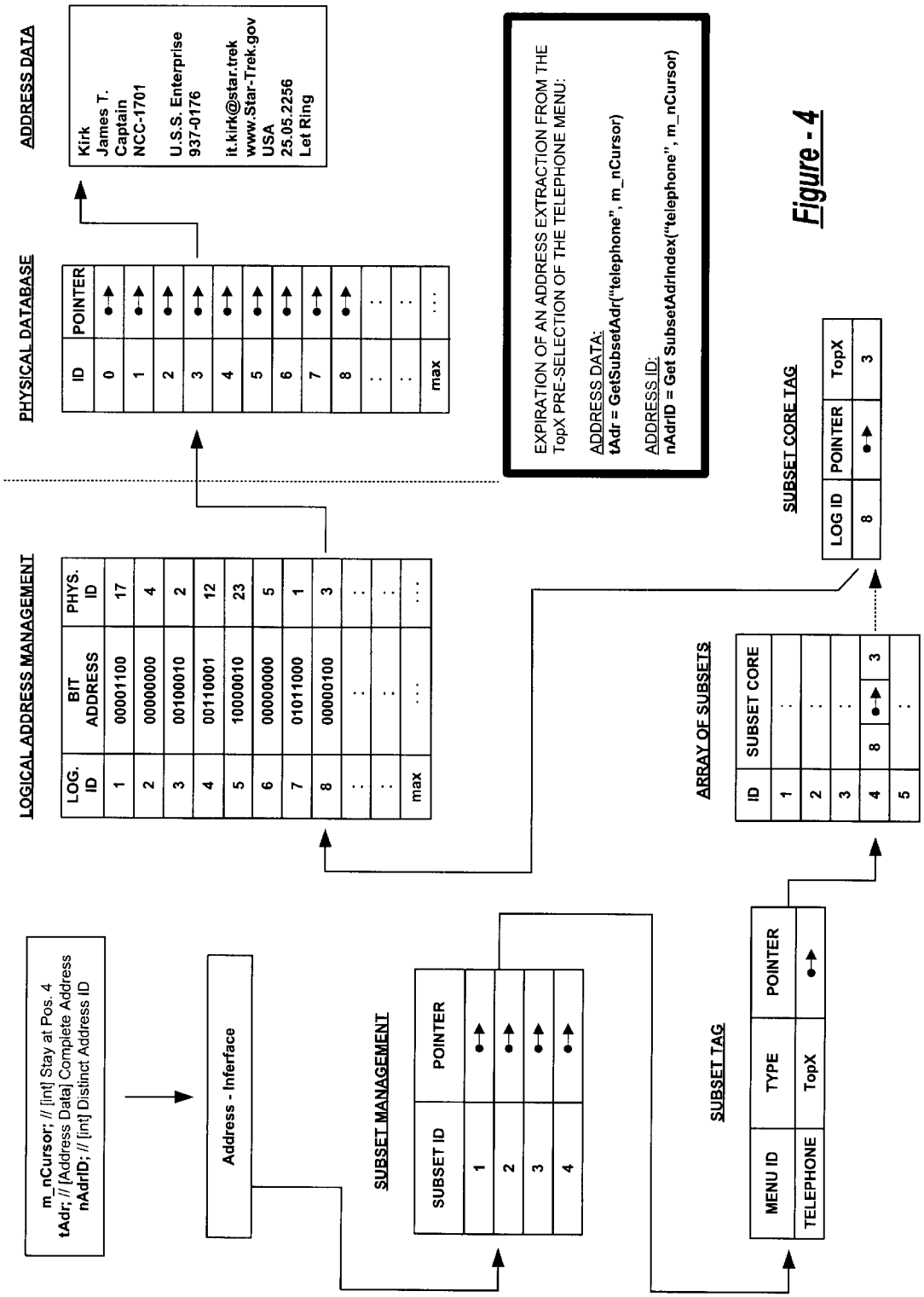
FIG. 4 a schematic illustration showing the interaction of the data structures of the address data storage device

In FIG. 4, the interaction of individual aforementioned lists for one predetermined example is indicated. It is to be assumed that the user looks for a telephone number which has been selected using the rotary switch 22 and the respective menus displayed on the monitor 24 that the user wants to select from the subset list TopX. That means at first that the subset ID 2 of the list subset-management (ID 2 is used for TopX) is selected, and hence provides a pointer to the respective subset-tag. There, the user authorization is checked on the basis of the menu-ID and then an address pointer to the selected subset will be provided. This subset will then be displayed on the monitor 24. In the present embodiment the subset contains five elements in total, that means address data records, which are displayed on the monitor 24 in a predetermined format (for example only prename and name). The user has then the possibility to move the cursor from one address data record to the next by the use of the rotary switch 22 and to make a selection by pushing the rotary switch 22. In the present embodiment it is assumed that the user has moved the cursor to the forth address data record and has selected the same. In the respective subset-core-tag the logical address (logical ID 8) is indicated. With this logical ID 8 the physical address 3 is obtained from the logical address management list and from the respective list (FIG. 3b) the address pointer, i.e. the exact physical address, of the selected address data record. This record will then be displayed on the monitor 24. Further the user is asked via the monitor 24 whether he will call this participant. If this question is answered with yes, the interface 35 being responsible for the telephone system 31 will separate only the telephone number from the address data record and will transfer it to the telephone system 31 for dialing.

In a similar manner, the selection of an address data record for the navigation system or the e-mail system is performed, wherein the respective application specific interface 35 separates the necessary single data from the complete address data record after the selection of the address data record and transfers the data to the respective apparatus 30 for further processing.

It is to be understood, that the described data structure of the particular lists is chosen on an exemplary basis and is not to be understood as a limitation. Rather, the described functions can be achieved also by use of different data structures.

In summary, it is apparent that the address data storage device according to the present invention achieves a great simplification for the user since he can access a central address data base (address book) for different apparatuses. Hence, the difficult and strenuous input of desired address data for each individual apparatus is omitted. Moreover it is possible by providing respective interfaces to carry out the transfer from a so-called PDA to the address data storage device with the result that the input of address data in the vehicle becomes superfluous.

What is claimed is:

1. Address storage device for a vehicle, particularly a motor vehicle, with several apparatuses using at least parts of address data, the address storage device comprising a storage means for storing address data and a storage-means interface, characterized in that each apparatus is assigned to an application interface, each application interface communicates with said storage means interface and—as required—reads out at least parts of address data stored in said storage means, so that said address data stored centrally in said storage means are available to said apparatuses commonly.

2. Address storage device of claim 1, characterized in that said storage means interface is connected with an input/output unit, the input/output unit allowing the display of address data and the selection of address data.

3. Address storage device of claim 1 or 2, characterized in that storage means interface comprises an address management unit for arranging different subsets of address data and for displaying said subsets.

4. Address storage device of claim 3, characterized in that a subset contains address data recently used and/or a subset contains address data used most frequently.

5. Address storage device of claim 2, characterized in that said I/O-unit is connected with a infrared interface, as to allow optical transmission of address data to and from an external address database.

6. Address storage device of claim 2, characterized in that said I/O-unit is connected with a radio interface, as to allow transmission of address data to and from an external address database.

7. Address storage device of claim 2, characterized in that said I/O-unit is adapted to build up a connection with the Internet, as to read out address data from a server based address database.

8. Address storage device of claim 2, characterized in that said I/O-unit is connected with an input means, comprising a rotary switching means, as to allow input of address data.

9. Address storage device of claim 1, characterized in that one of said apparatuses is a navigation system or a telephone system or an e-mail system or an Internet system.

10. Address storage device of claim 9, characterized in that said application interface reads out and transfers to the apparatus only those parts of said address data, which are required by said apparatus.

11. Address storage device of claim 1, characterized in that said storage means is provided as a hard disk or an electrically erasable and programmable read only memory (EEPROM).

* * * * *